(12) United States Patent
Chang

(10) Patent No.: US 10,816,030 B2
(45) Date of Patent: Oct. 27, 2020

(54) TWO-PIECE ANTI-LOOSENING NUT ASSEMBLY

(71) Applicant: Unitech Products Corp., Tainan (TW)

(72) Inventor: Zephyr Chang, Tainan (TW)

(73) Assignee: SPEC PRODUCTS CORP., Tainan (TW)

( * ) Notice: Subject to any disclaimer, the term of this patent is extended or adjusted under 35 U.S.C. 154(b) by 233 days.

(21) Appl. No.: 16/004,565

(22) Filed: Jun. 11, 2018

(65) Prior Publication Data

US 2019/0234447 A1 Aug. 1, 2019

(30) Foreign Application Priority Data

Jan. 30, 2018 (TW) .............................. 107201464 U

(51) Int. Cl.
| | |
|---|---|
| *F16B 39/24* | (2006.01) |
| *F16B 39/282* | (2006.01) |
| *F16B 41/00* | (2006.01) |
| *F16B 43/00* | (2006.01) |

(52) U.S. Cl.
CPC ............ *F16B 39/24* (2013.01); *F16B 39/282* (2013.01); *F16B 41/002* (2013.01); *F16B 43/00* (2013.01)

(58) Field of Classification Search
CPC ........ F16B 39/14; F16B 39/24; F16B 39/282; F16B 39/32; F16B 39/34; F16B 39/36; F16B 41/002; F16B 43/00; F16B 43/002; Y10S 411/961
USPC .... 411/138, 141, 142, 145, 147, 149, 371.2, 411/533, 538
See application file for complete search history.

(56) References Cited

U.S. PATENT DOCUMENTS

| | | | | | |
|---|---|---|---|---|---|
| 2,754,872 | A | * | 7/1956 | Poupitch | ................. F16B 39/24 411/134 |
| 5,080,545 | A | * | 1/1992 | McKinlay | ............. F16B 39/282 411/136 |
| 5,190,423 | A | * | 3/1993 | Ewing | ................... F16B 39/282 411/134 |
| 5,203,656 | A | * | 4/1993 | McKinlay | ............... F16B 39/24 411/149 |
| 5,314,279 | A | * | 5/1994 | Ewing | ................... F16B 39/282 411/134 |
| 5,626,449 | A | * | 5/1997 | McKinlay | ............. F16B 39/282 411/136 |
| 6,776,565 | B2 | * | 8/2004 | Chang | ................... F16B 39/282 411/136 |
| 6,966,735 | B1 | * | 11/2005 | Yamazaki | ............... F16B 39/24 411/131 |

(Continued)

*Primary Examiner* — Roberta S Delisle
(74) *Attorney, Agent, or Firm* — Hammer & Associates, P.C.

(57) ABSTRACT

A two-piece anti-loosening nut assembly includes a nut and a washer. The nut is configured to threadedly engaged with a bolt and has a main body including an annular outer flange extending outwardly and radially from an end periphery thereof. The annular outer flange has an annular flange surface formed with a cam structure. The washer is fixedly disposed on the nut, and has a lower ring surface facing the annular flange surface and formed with a cam structure engaged with the cam structure of the annular flange surface, and an upper ring surface opposite to the lower ring surface and formed with a serrated structure configured to bite into a surface of a workpiece.

2 Claims, 9 Drawing Sheets

(56) References Cited

U.S. PATENT DOCUMENTS

| | | | |
|---|---|---|---|
| 7,497,652 B2* | 3/2009 | Lin | F16B 39/24 |
| | | | 411/132 |
| 2006/0216129 A1* | 9/2006 | Lin | F16B 39/282 |
| | | | 411/161 |
| 2010/0098511 A1* | 4/2010 | Andersson | F16B 39/282 |
| | | | 411/149 |
| 2010/0260580 A1* | 10/2010 | Andersson | F16B 39/24 |
| | | | 411/534 |
| 2016/0003287 A1* | 1/2016 | Andersson | F16B 39/282 |
| | | | 411/149 |
| 2016/0160904 A1* | 6/2016 | Lee | F16B 39/24 |
| | | | 411/332 |

* cited by examiner

TWO-PIECE ANTI-LOOSENING NUT ASSEMBLY

CROSS-REFERENCE TO RELATED APPLICATION

This application claims priority to Taiwanese Application No. 107201464, filed on Jan. 30, 2018.

FIELD

The disclosure relates to a nut, more particularly to a two-piece anti-loosening nut assembly.

BACKGROUND

Referring to FIGS. 1 to 3, a conventional nut 11 is applicable for used with a bolt 12, and coordinates with two washers 13 and two washers 14 to clamp and position two workpieces 15. Each of the washers 13, 14 has an anti-loosening effect. The washers 13 are disposed between one of the workpieces 15 and the nut 11. Each washer 13 includes a first ring surface 131 formed with a cam structure, and a second ring surface 132 opposite to the first ring surface 131 and formed with a serrated structure. The cam structures of the first ring surfaces 131 of the washers 13 are engaged with each other. The serrated structures of the second ring surfaces 132 of the washers 13 respectively bite into a surface of the nut 11 and a surface of the one of the workpieces 15.

When the washers 13 are slightly loosened caused by vibration of the bolt 12, the cam structures of the first ring surfaces 131 of the washers 13 are displaced relative to each other, as shown in FIG. 3, so that the distance between the nut 11 and the one of the workpieces 15 is increased. Simultaneously, an outer thread of the bolt 12 tightly abuts against an inner thread of the one of the workpieces 15, thereby achieving an anti-loosening effect. Moreover, a three-dimensional obstruction formed by the relative displacement of the cam structures of the washers 13 can prevent relative rotation between the washers 13, so that an anti-loosening effect can also be achieved.

However, the conventional nut 11 must coordinate with the two washers 13 during use thereof to achieve the anti-loosening effect, so that it is necessary to sleeve the washers 13 one by one on the bolt 12 first and then followed by the nut 11. Further, the number of the washers 13 used is large.

SUMMARY

Therefore, an object of the present disclosure is to provide a two-piece anti-loosening nut assembly that is capable of alleviating at least one of the drawbacks of the prior art.

Accordingly, a two-piece anti-loosening nut assembly of this disclosure includes a nut and a washer. The nut is configured to threadedly engaged with a bolt and has a main body that defines an axis and that includes an annular outer flange extending outwardly and radially from an end periphery of the main body. The annular outer flange has an annular flange surface surrounding the axis and formed with a cam structure. The washer has a ring shape and is fixedly disposed on the nut. The washer has a lower ring surface facing the annular flange surface and formed with a cam structure engaged with the cam structure of the annular flange surface, and an upper ring surface opposite to the lower ring surface and formed with a serrated structure configured to bite into a surface of a workpiece.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
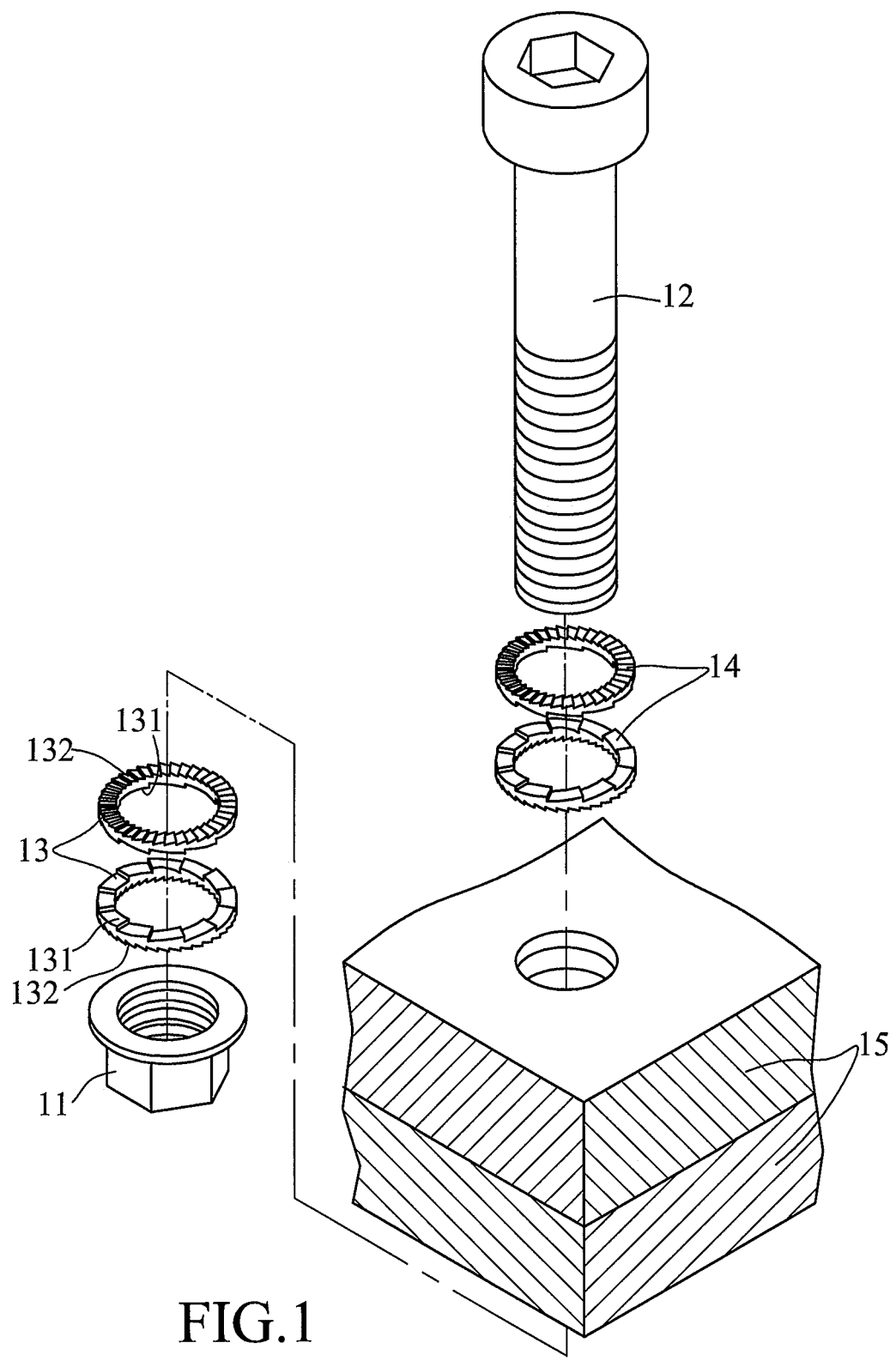
FIG. 1 is an exploded perspective view, illustrating how a conventional nut is used in coordination with a bolt and four washers.
Figure 2:
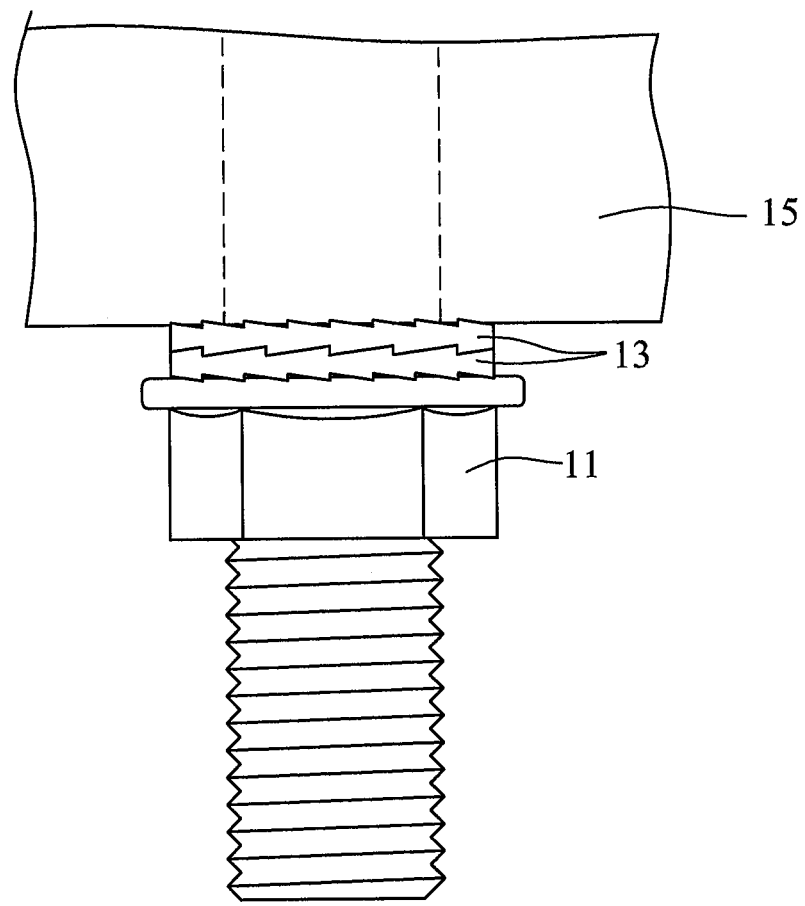
FIG. 2 is a fragmentary schematic view, illustrating the conventional nut in a state of use.
Figure 3:
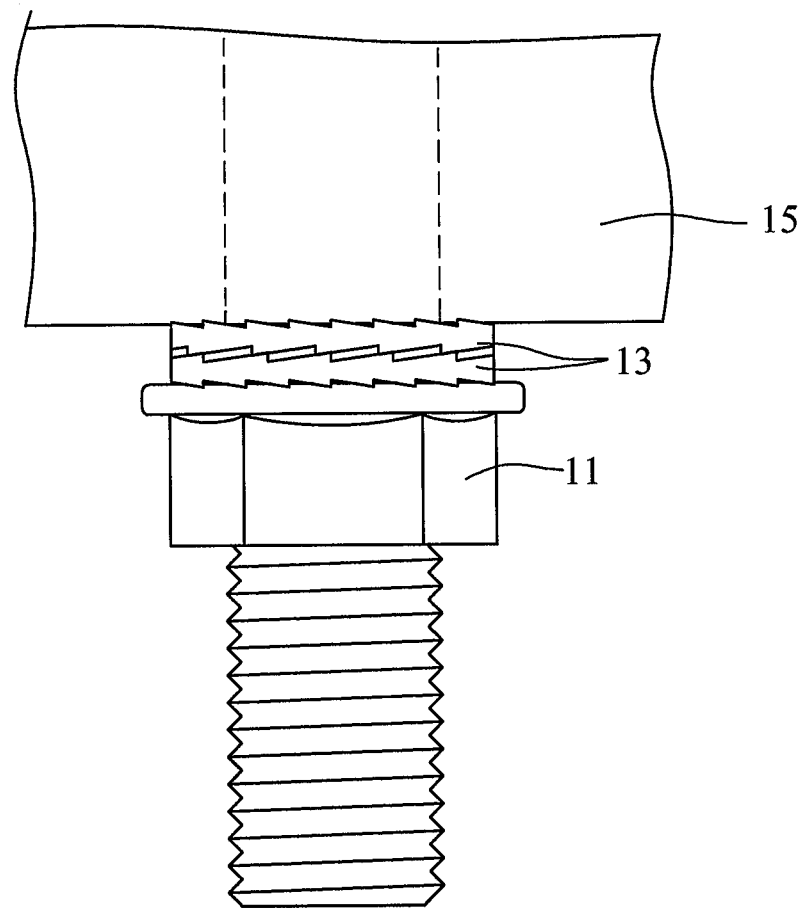
FIG. 3 is a view similar to FIG. 2, but illustrating two washers being displaced relative to each other.

Before the present disclosure is described in greater detail with reference to the accompanying embodiments, it should be noted herein that like elements are denoted by the same reference numerals throughout the disclosure.

Figure 4:
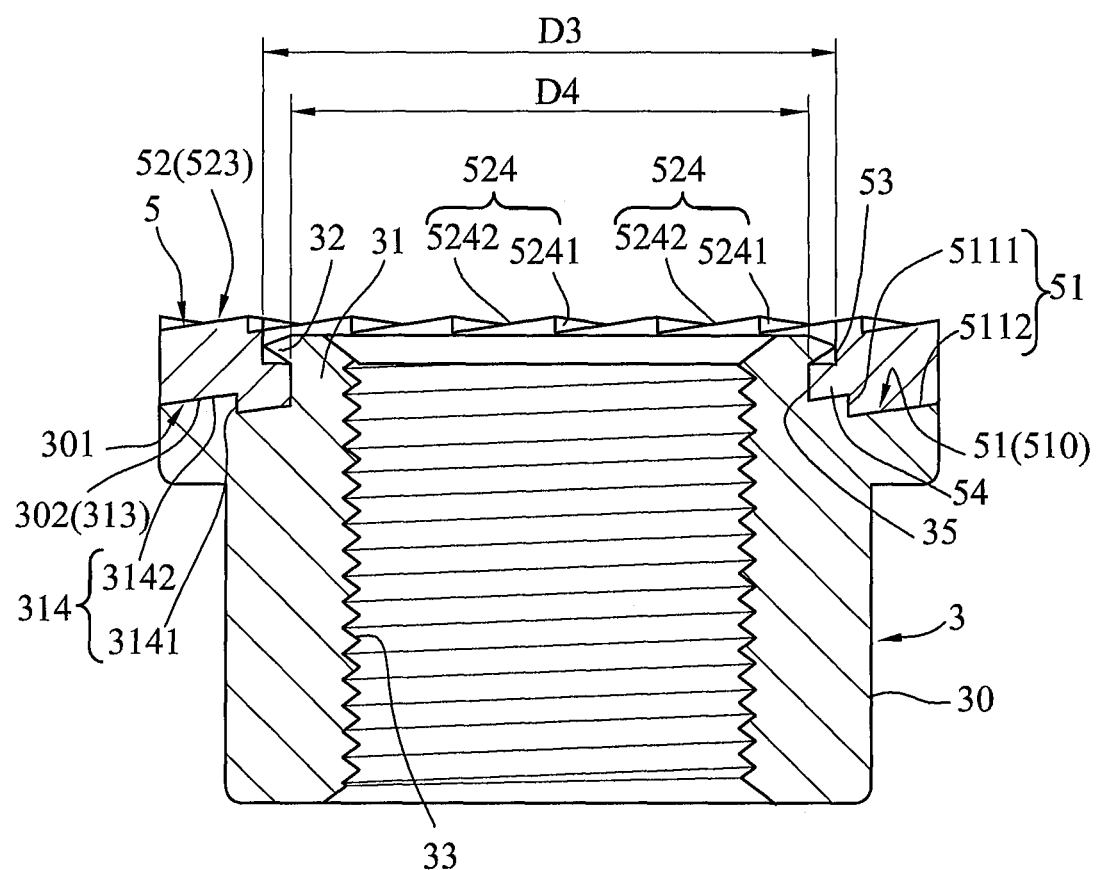
FIG. 4 is a sectional view of a two-piece anti-loosening nut assembly according to the first embodiment of this disclosure.
Figure 5:
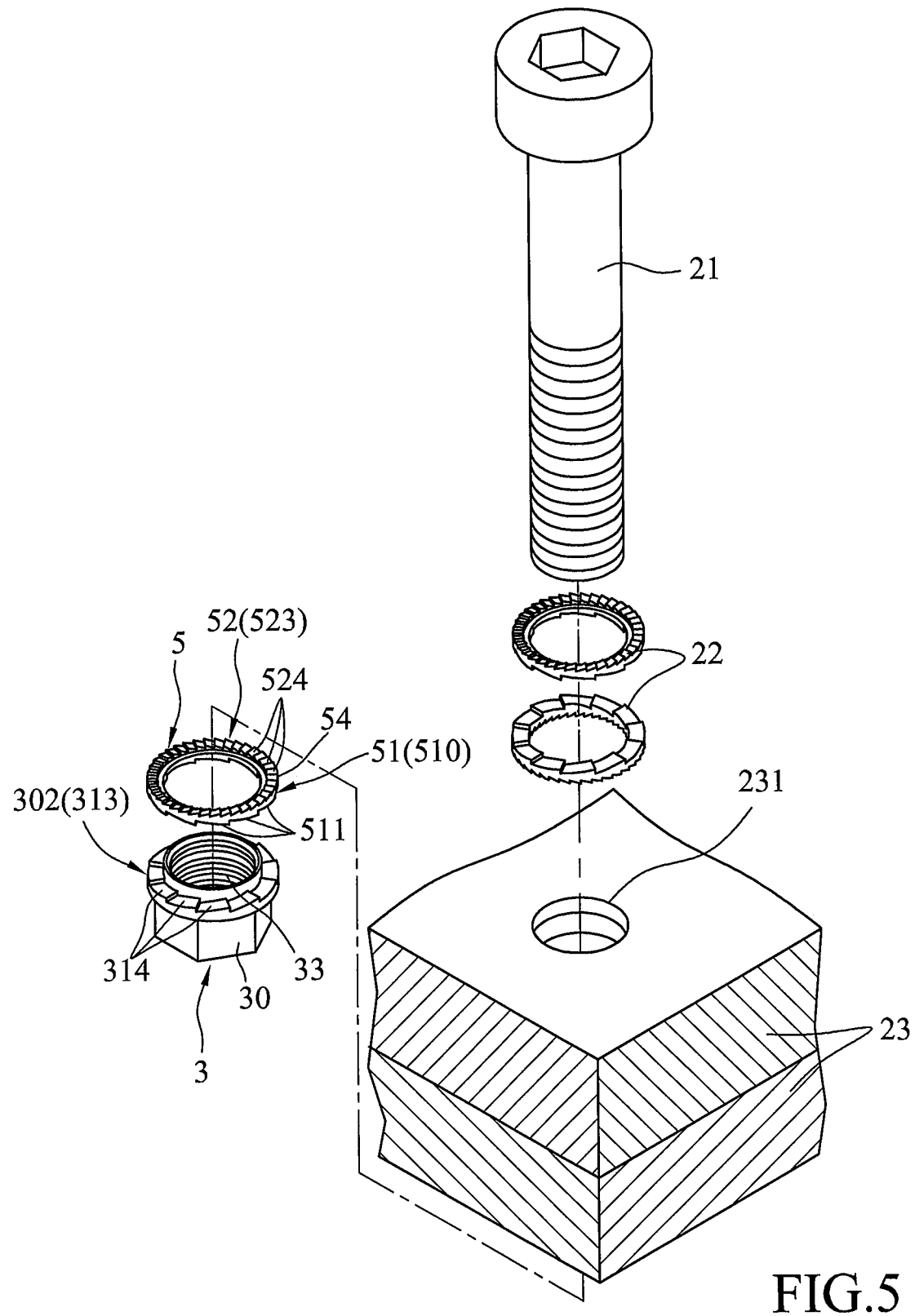
FIG. 5 is an exploded perspective view of the two-piece anti-loosening nut assembly of the first embodiment prior to assembly with a bolt, two washers, and two workpieces.
Figure 6:
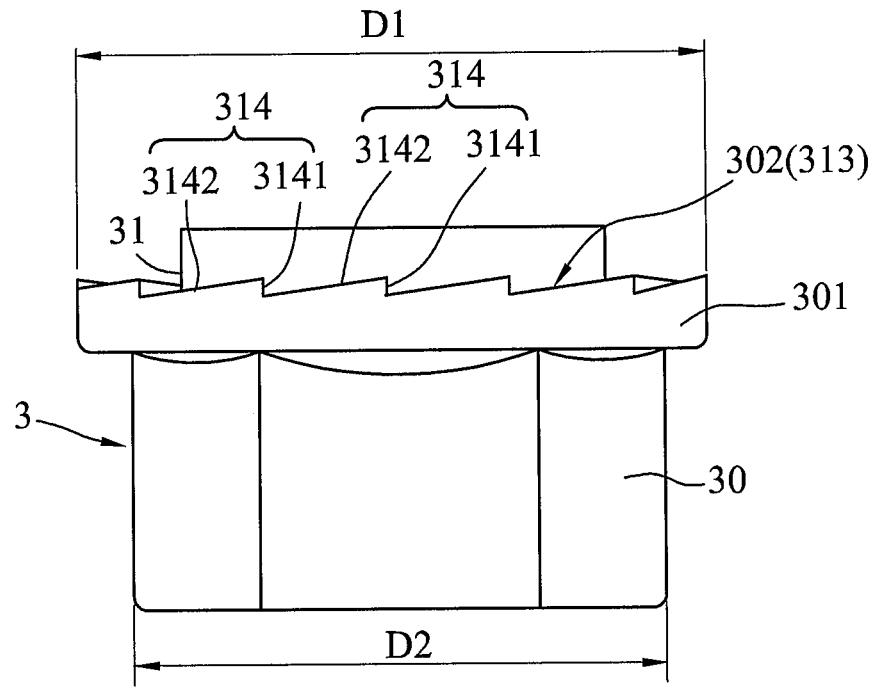
FIG. 6 is a schematic side view of a nut of the first embodiment.

Referring to FIGS. 4 to 6, a two-piece anti-loosening nut assembly according to the first embodiment of the present disclosure is configured to coordinate with a bolt 21 and two anti-loosening washers 22 to connect together two workpieces 23 each of which is formed with a screw hole 231. The two-piece anti-loosening nut assembly of this embodiment includes a nut 3 and a washer 5 riveted to the nut 3.

Figure 7:
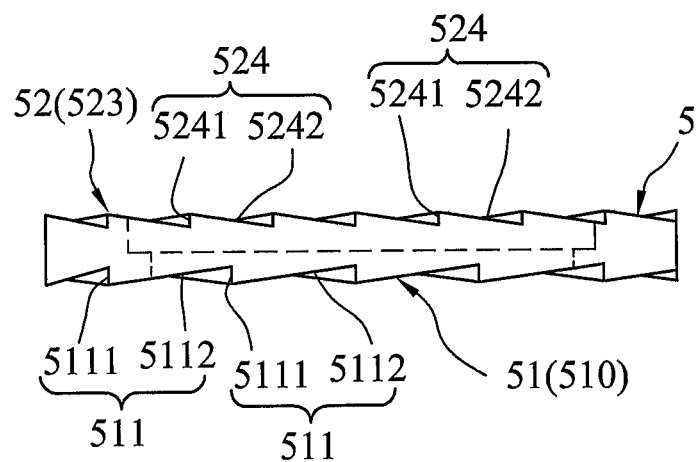
FIG. 7 is a schematic side view of a washer of the first embodiment.

Before proceeding with the detailed description of this embodiment, it should be noted herein that, although the washer 5 is riveted to the nut 3 and cannot be separated from the same, to facilitate understanding of the structure of this embodiment, the nut 3 and the washer 5 are shown in an exploded state in FIG. 5, and are individually illustrated in FIGS. 6 and 7.

The nut 3 has a main body 30 having a hexagonal shape and defining an axis. The main body 30 includes an annular outer flange 301 extending outwardly and radially from an end periphery of the main body 30, a neck portion 31 extending outwardly and coaxially from the end periphery of the main body 30, and an annular inner flange 32 extending outwardly and radially from the neck portion 31. The outer flange 301 has a flange surface 302 surrounding the neck portion 31 and formed with a cam structure 313. The cam structure 313 includes a plurality of spaced-apart radially extending cams 314. Each cam 314 has an abutment surface 3141 extending axially and outwardly from the flange surface 302, and an inclined surface 3142 that is inclined with respect to the flange surface 302 and that interconnects the abutment surfaces 3141 of two adjacent ones of the cams 314. The inner flange 32 and the outer flange 301 are spaced apart from each other to define a space 35 therebetween.

The nut 3 further has an inner thread 33 extending from an inner peripheral surface of the main body 30 to an inner peripheral surface of the neck portion 31 for threaded engagement of the nut 3 with the bolt 21. The abutment surface 3141 has a length extending radially and a width extending axially. The inclined surface 3142 has a length extending along the annular flange surface 302 and a width extending radially. The outer flange 301 has an outer diameter (D1) greater than an outer diameter (D2) of the main body 30. However, in actual application, the outer diameter (D1) may be equal to the outer diameter (D2).

Since the annular inner flange 32 is formed by riveting one end of the neck portion 31 that is opposite to the main body 30, an outer diameter (D3) of the annular inner flange 32 is greater than an outer diameter (D4) of the neck portion 31. In this embodiment, the outer diameter (D3) is smaller than the outer diameter (D1).

Referring to FIG. 7, in combination with FIGS. 4 to 6, the washer 5 has a ring shape, is sleeved on the neck portion 31 and is limited between the outer flange 301 and the inner flange 32. Particularly, the washer 5 has a lower ring surface 51 facing the flange surface 302 and formed with a cam structure 510 engaged with the cam structure 313, an upper ring surface 52 opposite to the lower ring surface 51 and formed with a serrated structure 523 configured to bite into a surface of one of the workpieces 23, an inner peripheral surface 53 interconnecting inner peripheries of the lower and upper ring surfaces 51, 52, and an annular protrusion 54 extending inwardly and radially from the inner peripheral surface 53 into the space 35 defined by the inner and outer flanges 32, 301. The cam structure 510 includes a plurality of spaced-apart radially extending cams 511. Each cam 511 has an abutment surface 5111 extending axially and outwardly from the lower ring surface 51, and an inclined surface 5112 that is inclined with respect to the lower ring surface 51 and that interconnects the abutment surfaces 5111 of two adjacent ones of the cams 511. The abutment surface 5111 has a length extending radially and a width extending axially. The inclined surface 5112 has a length extending along the lower ring surface 51 and a width extending radially.

The serrated structure 523 of the upper ring surface includes a plurality of spaced-apart radially extending serrations 524 each of which has a straight surface 5241 substantially parallel to the axis of the main body 30, and an inclined surface 5242 that is inclined with respect to the upper ring surface 52 and that interconnects the straight surfaces 5241 of two adjacent ones of the serrations 524. The straight surface 5241 has a length extending radially and a width extending axially. The inclined surface 5242 of each serration 524 is smaller than the inclined surface 5112 of each cam 511.

Figure 8:
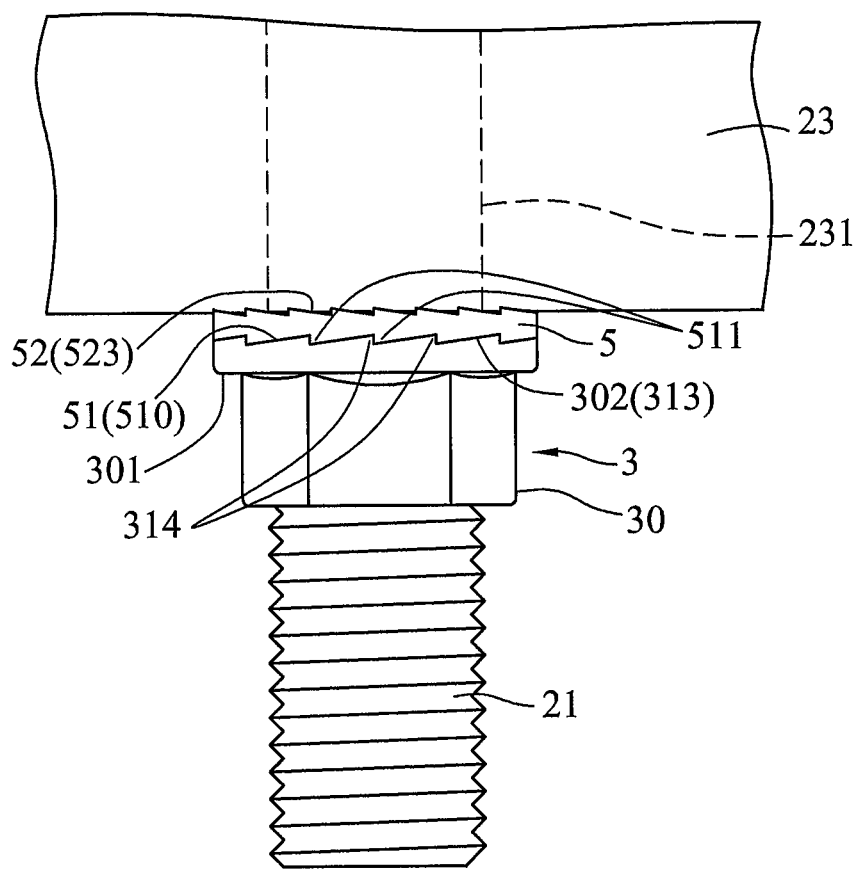
FIG. 8 is a fragmentary side view, illustrating the first embodiment in a state of use.

Referring to FIG. 8, in combination with FIGS. 4 and 5, to use the first embodiment, the two anti-loosening washers 22 are first sleeved on the bolt 21 in a conventional manner, after which the bolt 21 is threaded through the screw holes 231 of the two superimposed workpieces 23. Next, the nut assembly of the first embodiment is directly screwed onto the bolt 21 until the serrated structure 523 of the upper ring surface 52 of the washer 5 bites into a lower one of the workpieces 23, as shown in FIG. 8. Since the washer 5 is riveted to the nut 3 in this embodiment, there is no need to separately sleeve the washer 5 on the bolt 21, so that use of the nut assembly of this embodiment is very convenient. Moreover, since the washer 5 is fixedly disposed on the nut 3 through engagement of the cam structure 510 on the lower ring surface 51 thereof with the cam structure 313 on the outer flange 301 of the nut 3, in comparison with the conventional nut 11 (see FIG. 1) which must coordinate with the two washers 13 (see FIG. 1) during use thereof, the nut assembly of this embodiment has the advantage of saving the use of the washer 5.

Figure 9:
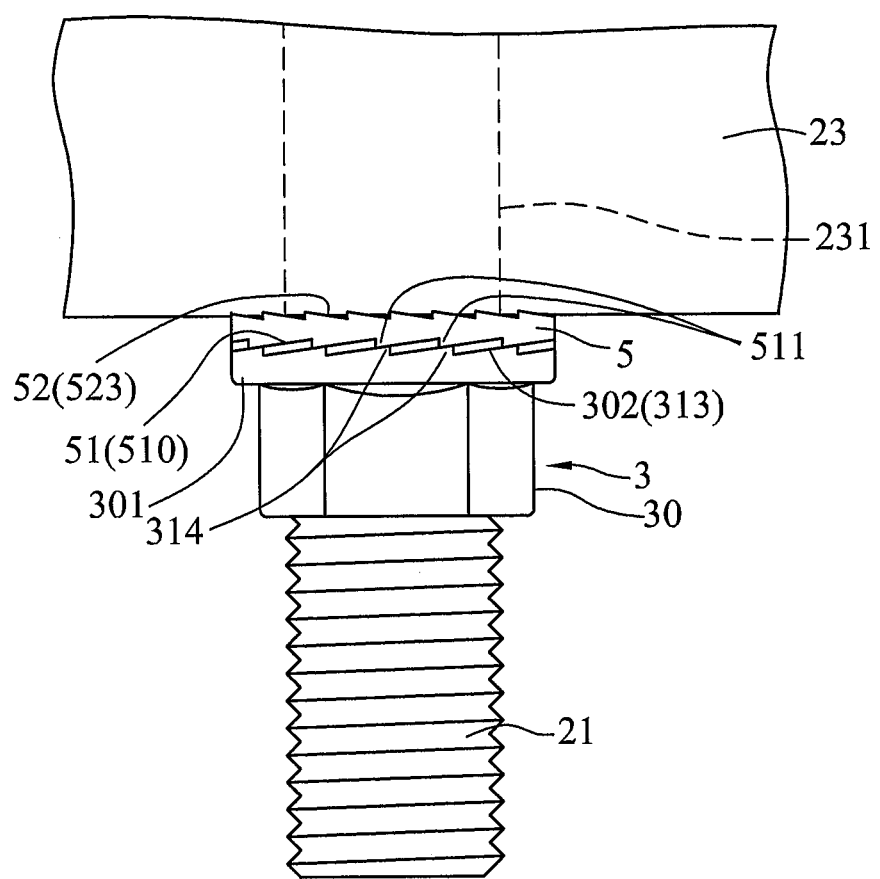
FIG. 9 is a view similar to FIG. 8, but illustrating the nut and the washer of the first embodiment being displaced relative to each other.

In the event that the bolt 21 slightly rotates due to vibration of the workpieces 23, the cams 314 of the nut 3 and the cams 511 of the washer 5 are displaced relative to each other, as shown in FIG. 9, so that a distance between the main body 30 of the nut 3 and the lower workpiece 23 is increased, and so that the thread of the bolt 21 is pressed tightly against the threads of the screw holes 231 of the workpieces 23, thereby preventing rotation of the bolt 21 relative to the workpieces 23 and thereby achieving an anti-loosening effect.

Figure 10:
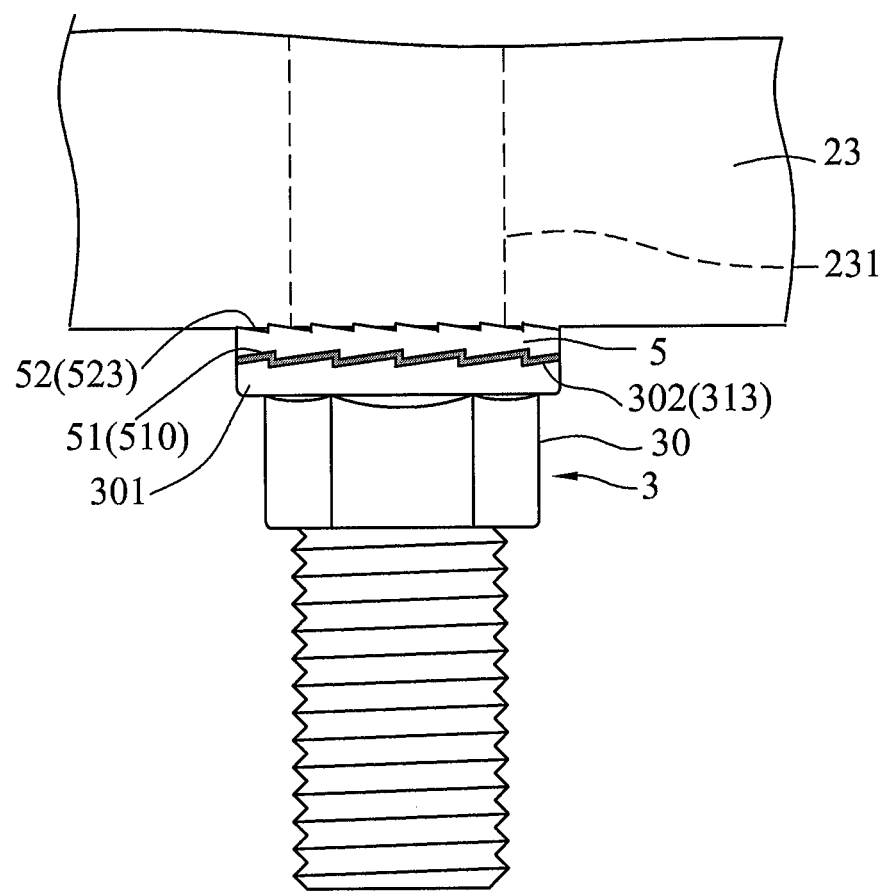
FIG. 10 is a fragmentary side view, illustrating a two-piece anti-loosening nut assembly according to the second embodiment of this disclosure in a state of use.

Referring to FIG. 10, the second embodiment of the two-piece anti-loosening nut assembly according to this disclosure is generally identical to the first embodiment, and differs in that, in the second embodiment, the neck portion 31 (see FIG. 4) and the annular inner flange 32 (see FIG. 4) are dispensed herewith, and the lower ring surface 51 of the washer 5 is directly adhered to the flange surface 302 of the outer flange 301 of the nut 3 by an adhesive 6, so that the washer 5 cannot rotate relative to the nut 3. Since the washer 5 is directly adhered to the outer flange 301 of the nut 3, the second embodiment similarly has the advantage of saving the use of the washer 5, and there is no need to separately sleeve the washer 5 on the bolt 21. Hence, use of the nut assembly of this embodiment is also very convenient.

In sum, the advantages of the two-piece anti-loosening nut assembly of this disclosure can be summarized as: because the flange surface 302 of the outer flange 301 of the nut 3 and the lower ring surface 51 of the washer 5 are respectively provided with the cam structure 313, 510, the nut assembly of this disclosure can achieve the anti-loosening effect and can save the use of the washer 5. Further, the washer 5 is connected to the nut 3 through riveting in the first embodiment, and is adhered to the nut 3 through the adhesive 6 in the second embodiment, so that the nut assembly of this disclosure has the advantage of eliminating the need to sleeve the washer 5 on the screw 3.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A two-piece anti-loosening nut assembly comprising:
a nut configured to threadedly engaged with a bolt and having a main body that defines an axis and that includes an annular outer flange extending outwardly and radially from an end periphery of said main body, said annular outer flange having an annular flange surface surrounding the axis and formed with a cam structure; and
a washer having a ring shape and fixedly disposed on said nut, said washer having a lower ring surface facing said annular flange surface and formed with a cam structure engaged with said cam structure of said annular flange surface, and an upper ring surface opposite to said lower ring surface and formed with a serrated structure configured to bite into a surface of a workpiece;
wherein said cam structure of each of said annular flange surface and said lower ring surface includes a plurality of spaced-apart radially extending cams each of which has an abutment surface extending axially and outwardly from a corresponding one of said annular flange surface and said lower ring surface, and an inclined surface that is inclined with respect to the corresponding one of said annular flange surface and said lower ring surface and that interconnects said abutment surfaces of two adjacent ones of said cams, said serrated structure of said upper ring surface including a plurality of spaced-apart radially extending serrations each of which has a straight surface substantially parallel to the axis of the main body, and an inclined surface that is inclined with respect to said upper ring surface and that interconnects said straight surfaces of two adjacent ones of said serrations, said inclined surface of each of said serrations being smaller than said inclined surface of each of said cams;
wherein said abutment surface of each of said cams has a length extending radially and a width extending axially, said inclined surface of each of said cams having a length extending along the corresponding one of said annular flange surface and said lower ring surface and a width extending radially, said straight surface of each of said serrations having a length extending radially and a width extending axially;
wherein said annular outer flange has an outer diameter greater than an outer diameter of said main body; and
wherein said main body further includes a neck portion extending outwardly and coaxially from said end periphery of said main body, and an annular inner flange extending outwardly and radially from said neck portion, said annular inner flange and said annular outer flange being spaced apart from each other to define a space therebetween, said washer being sleeved on said neck portion and further having an inner peripheral surface interconnecting inner peripheries of said lower and upper ring surfaces, and an annular protrusion extending inwardly and radially from said inner peripheral surface into said space.

2. The two-piece anti-loosening nut assembly as claimed in claim 1, wherein said annular inner flange is formed by riveting one end of said neck portion that is opposite to said main body.

* * * * *